United States Patent Office 3,330,648
Patented July 11, 1967

3,330,648
PROCESS FOR THE LEACHING OF PYRITE CINDERS
Angel Vian-Ortuno, Segundo Jimenez-Gomez, and Federico Lopez-Mateos, Madrid, Spain, assignors to Empresa Auxiliar de la Industria, S.A., Madrid, Spain
No Drawing. Filed Apr. 22, 1964, Ser. No. 361,896
Claims priority, application Spain, Apr. 23, 1963, 287,294
9 Claims. (Cl. 75—101)

The present invention relates to a process for the leaching of pyrites and, more particularly, the present invention is concerned with the removal of impurities from pyrite cinders, for instance, the cinders obtained by roasting of pyrites in a fluidized bed.

The roasting of ferrous and ferro-cupriferrous pyrites yields pyrite cinders consisting essentially of ferric oxide accompanied by variable quantities of impurities such as copper, zinc, lead, arsenic, gold and silver in elementary or bound form. The further siderurgical processing of these cinders requires as complete as possible an elimination of the mentioned impurities and, it is also desirable to recover all or some of these "impurities," for instance to separately recover the individual metals thereof.

The most frequently employed method for the separation and eventual recovery of the metallic or non-metallic impurities contained in the pyritic cinders, consists in washing the cinders with a leaching liquor composed of an aqueous solution of about 5% surfuric acid. It is an advantage of this prior art method that the sulfuric acid is relatively inexpensive and very frequently is produced in conjunction with the roasting of the pyrite in the same industrial establishment.

However, certain serious disadvantages are connected with the sulfuric acid leaching of pyrite cinders.

Thus, a preceding and relatively expensive treatment of the cinders is required, consisting of a further chloriding roasting in order to increase the solubility of copper and silver which metals previously were present as sulfides, since the sulfides of copper and silver are insoluble in the sulfuric acid leaching liquor.

Furthermore, all of the gold and a considerable part of the silver contained in the cinders will remain insoluble and thus, for recovery of gold and silver a subsequent additional leaching of the cinders with chlorine water is required.

In addition, lead is not dissolved at all by leaching with sulfuric acid but is retained as lead sulfate, and only an insufficiently small proportion of the arsenic is dissolved. The preceding chloriding roasting makes the arsenic even more insoluble, because during such chloriding roasting the iron arsenates are subjected for a long period of time to high temperatures and thereby their structure will gradually change so that these arsenates become less soluble in the leaching liquor.

It is therefore an object of the present invention to provide a method for the leaching of pyrite cinders so as to remove the above mentioned impurities therefrom, which method overcomes the difficulties and disadvantages of the above described prior art method.

It is a further object of the present invention to provide a method of leaching pyrite cinders so as to remove the above discussed impurities therefrom which method can be carried out in a simple and economical manner.

It is yet another object of the present invention to provide a method for the removal of the above described impurities from pyrite cinders which will give good results in the treatment of pyrite cinders obtained by a simple one-step fluidized roasting process.

Other objects and advantages of the present invention will become apparent from a further reading of the description and of the appended claims.

With the above and other objects in view, the present invention contemplates a method of removing impurities from pyrite cinders, which comprises the step of leaching pyrite cinders with an aqueous solution containing as leaching agents $NO_3$ and $H$ ions, and preferably also containing $Cl$ ions.

According to a preferred embodiment of the present invention, impurities such as copper, zinc, lead, arsenic, gold and silver are removed from the pyrite cinders by leaching the same for about two hours at about 70° C. with an aqueous solution of about 3% by weight of nitric acid and about 5% by weight of sodium chloride, whereby preferably an amount of the solution is applied which is approximately equal by weight to the amount of cinders which are to be leached.

Thus, according to the present invention, the leaching solution must contain as a leaching agent $NO_3$ ions, and preferably will also contain as additional leaching agent $Cl$ ions and, of course, the leaching solution must be free of any ions or constituents which would interfere with the dissolution of the above mentioned impurities.

It has been found that aqueous solutions of nitric acid having a concentration far below 10% such as about 3%, will dissolve the oxides, sulfides and sulfates of copper, zinc, silver, cobalt and lead, and also arsenates of high basicity. The solubility of these compounds in the leaching solution or liquor is increased by the presence of chlorine ions in the leaching liquor. Chlorine ions may be supplied by introducing a soluble chloride, preferably an alkali metal chloride such as sodium chloride, into the $NO_3$ ions-containing leaching liquor. The leaching liquor which in addition to $NO_3$ ions also contains $Cl$ ions, is also capable of dissolving gold. This may be explained by the fact that in the leaching liquor consisting, for instance, of an aqueous solution of nitric acid and sodium chloride, the following reaction takes place:

(1) 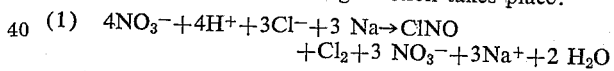

The thus obtained strongly oxidizing solution will facilitate the dissolution of residual sulfides and gold.

It is, of course, also possible to obtain the $NO_3$ and $Cl$ ions-containing solution from another combination of reagents, for instance, by substituting hydrochloric acid for the nitric acid and sodium nitrate for the sodium chloride. In this manner, a particularly reactive solution is formed according to the following formula:

(2) 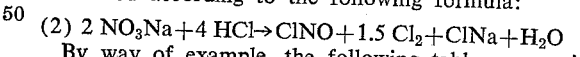

By way of example, the following table summarizes the treating of three different types of pyrite cinders with different leaching solutions.

Pyrite cinders I and II were obtained from one stage turbulent roasting in a fluidized bed, and cinders III were obtained from one stage turbulent sulfating roasting.

With respect to each of the impurities such as copper, and zinc, etc. listed in the table, "A" denotes cinder composition prior to treatment; "B" cinder composition after leaching with 5% sulfuric acid solution; "C" cinder composition after leaching with 3% nitric acid solution; and "D" cinder composition after leaching with an aqueous solution of 3% nitric acid and 5% sodium chloride.

Throughout this application all leaching liquors are aqueous solutions and all percentage figures are given in percent by weight.

In the table, the copper, zinc, lead and arsenic contents are given in percent by weight, while the gold and silver contents are given in gram per metric ton.

In all examples summarized in the table, leaching was carried out for two hours at a temperature of 70° C. with an amount of leaching liquor equal in weight to the amount of cinders which were thus treated.

TABLE I

| Content of— | Treatment | Products | | |
|---|---|---|---|---|
| | | Cinder I | Cinder II | Cinder III |
| Copper, percent | A | 0.71 | 0.80 | 0.90 |
| | B | 0.10 | 0.18 | 0.11 |
| | C | 0.12 | 0.23 | 0.15 |
| | D | 0.08 | 0.17 | 0.08 |
| Zinc, percent | A | 2.71 | 3.14 | 2.90 |
| | B | 0.39 | 0.85 | 0.51 |
| | C | 0.61 | 1.37 | 0.58 |
| | D | 0.16 | 0.64 | 0.33 |
| Lead, percent | A | 1.36 | 0.90 | 0.78 |
| | B | 1.36 | 0.90 | 0.78 |
| | C | 0.26 | 0.06 | 0.12 |
| | D | 0.10 | 0 | 0 |
| Arsenic, percent | A | 0.53 | 0.42 | 0.56 |
| | B | 0.15 | 0.05 | 0.14 |
| | C | 0.10 | 0.02 | 0.11 |
| | D | 0.03 | 0.01 | 0.06 |
| Gold, grams/ton | A | 0.75 | 1.15 | 1.40 |
| | B | 0.75 | 1.15 | 1.40 |
| | C | 0.75 | 1.15 | 1.40 |
| | D | 0.3 | 0.35 | 0.45 |
| Silver, grams/ton | A | 14 | 12 | 17 |
| | B | 9 | 9.25 | 13 |
| | C | 3 | 3 | 12 |
| | D | 0 | 0 | 2 |

The method of the present invention is of particular usefulness in connection with the leaching of cinders obtained by the fluidized (turbulent) roasting of pyrites. In this manner of roasting, particularly by one-stage roasting, the arsenic and the lead of the pyrites are substantially completely retained in the cinders and this causes great disadvantages and difficulties with respect to the subsequent use of the cinders for siderurgical purposes. The prior art leaching with sulfuric acid which has been described further above does not at all diminish the high lead content of such cinders, and arsenic is not eliminated to a sufficiently high degree to reduce remaining proportion of arsenic below the tolerable limit of between 0.08 and 0.1%. Consequently, it is generally required that such arsenic and lead-containing pyrites are roasted in mechanical furnaces which are more expensive to operate than fluidized bed furnaces and give a lesser yield. When fluidization furnaces are used, attention must be paid either to special subsequent dearsenication steps and to the removal of lead, all of which is expensive, complicated and frequently of doubtful efficiency, or special roasting methods must be used wherein the roasting is carried out in two or more stages. Roasting in several stages evidently is more expensive and more complicated than simply roasting in a single fluidized stage.

The leaching process of the present invention, utilizing aqueous nitric acid, or a leaching liquor which contains $NO_3$ and Cl ions, can be advantageously carried out with cinders obtained in a simple one-stage fluidized roasting of pyrites, in other words in the most simple and economical manner. It is thus not necessary to condition the cinders by a subsequent chloriding re-roasting, and it is also not necessary to carry out a second leaching with chlorine water in order to extract silver and gold.

Furthermore, not only are the cinders after being subjected to the leaching process of the present invention immediately suitable for further siderurgical processing, but it is also possible to recover the lead from the spent leaching liquor in a very simple manner, for instance, by precipitating the lead dissolved in the leaching liquor with sulfuric acid and separating the precipitated lead sulfate by decantation or filtration.

While it has been found preferable to operate with leaching liquors containing about 3% nitric acid and about 5% sodium chloride, it is possible to carry out the method of the present invention within a wide range of concentrations of $NO_3$ and Cl ions in the leaching liquor. Preferably, however, the $NO_3$ ion concentration in the leaching liquor will be such as to be equivalent to a nitric acid concentration of between 0.5 and 10% and the Cl ion concentration in the leaching liquor will be such as to be equal to a sodium chloride concentration of between 3 and 15%.

As pointed out above, the $NO_3$ and Cl ions may also be derived from dissolving other compounds than nitric acid and sodium chloride in the water of the leaching liquor. Thus, for instance, instead of sodium chloride other chlorides, preferably alkali metal chlorides, may be used, or hydrochloric acid may be used instead of nitric acid, combined with a suitable nitrate, such as sodium nitrate.

It is also possible to use as substitute for the nitric acid the wash waters obtained by washing gases derived from the direct catalytic oxidation of ammonia. This frequently makes the treatment less expensive since it is not necessary to utilize commercially available more or less pure nitric acid in order to obtain the $NO_3$ ions for the leaching liquor. The spent wash waters of the gases obtained in the catalytic oxidation of ammonia will contain, in addition to $NO_3$ ions, also $NO_2$ ions, however, the latter do not interfere with the leaching process.

Preferably, the amount of leaching liquor by weight will be substantially equal to the amount by weight of pyrite cinders which are to be leached. However, good results are also obtained with different proportions of leaching liquor relative to the pyrite cinders, such as for instance with leaching liquor in an amount which is equal to between one and four times the weight of the cinders which have to be leached.

The temperature at which the leaching is carried out may also vary within wide limits, generally from ambient temperature up to slightly below the boiling point of the leaching liquid. It is possible to carry out the leaching under pressure in order to raise the boiling point and thereby to be able to leach at higher temperatures. However, generally it will be preferred to carry out the leaching at ambient pressure and at a temperature of about 70° C.

In general, it may be said that the extractive capacity of the liquor will increase with higher temperatures, prolonged contact time and increasing concentrations of $NO_3$, or of $NO_3$ and Cl, ions in the leaching liquor. However, higher temperatures, concentrations and prolonged extraction times will increase the costs of the process, and the most suitable concentration, temperature and extraction time will have to be determined in each case depending on the particular operating conditions and the composition of the pyrite cinders.

The conditions described in the examples are those which seem to be generally the most preferred under present economic conditions. However, the method is not to be considered limited to the specific details of the examples, for instance with respect to temperature, concentration of reactive ions and treating time as described in the examples.

*Example 1*

The available cinders contain the elements Cu, Pb, Zn, As, Au and Ag as follows:

Copper _____ percent__ 0.71
Zinc _____ do____ 2.71
Lead _____ do____ 1.36
Arsenic _____ do____ 0.53
Gold _____ gr./tn__ 0.75
Silver _____ gr./tn__ 14

They are treated with a leaching liquor containing 3% of $NO_3H$ and 5% of ClNa, during 4 hours at a temperature near—although inferior—to that of boiling of the leaching liquor. The cinders are separated by filtration and washed with water, obtaining by this way a final cinder which contains the aforementioned cements as follows:

| | | |
|---|---|---|
| Copper | percent | 0.08 |
| Zinc | do | 0.16 |
| Lead | do | 0.10 |
| Arsenic | do | 0.06 |
| Gold | gr./tn | 0.3 |
| Silver | gr./tn | 2.0 |

*Example 2*

The available cinders contain the elements Cu, Pb, Zn, As, Au and Ag as follows:

| | | |
|---|---|---|
| Copper | percent | 0.92 |
| Zinc | do | 0.91 |
| Lead | do | 0.80 |
| Arsenic | do | 0.59 |
| Gold | gr./tn | 1.15 |
| Silver | gr./tn | 12 |

They are treated with a leaching liquor containing 3% of $NO_3H$, 3.6% of ClH and 5% of ClNa during 4 hours at tempeatures between 70° C. and 90° C. The cinders are separated by filtration and washed with water, obtaining by this way a final cinder, containing:

| | | |
|---|---|---|
| Copper | percent | 0.05 |
| Zinc | do | 0.10 |
| Lead | do | 0.01 |
| Arsenic | do | 0.04 |
| Gold | gr./tn | 0.35 |
| Silver | gr./tn | 0 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of removing impurities from pyrite cinders, comprising the steps of contacting pyrite cinders with an aqueous leaching solution including as leaching agents effective amounts of $NO_3$, Cl and H ions so as to remove at least a portion of said impurities from said pyrite cinders; and separating the thus treated cinders from said solution.

2. A method of removing impurities from pyrite cinders, comprising the steps of contacting pyrite cinders with a leaching solution consisting essentially of an aqueous solution of nitric acid and an alkali metal chloride so as to remove at least a portion of said impurities from said pyrite cinders; and separating the thus treated cinders from said solution.

3. A method of removing impurities from pyrite cinders, comprising the steps of contacting pyrite cinders with a leaching solution consisting essentially of an aqueous solution of nitric acid and sodium chloride so as to remove at least a portion of said impurities from said pyrite cinders; and separating the thus treated cinders from said solution.

4. A method of removing impurities from pyrite cinders, comprising the steps of contacting pyrite cinders with a leaching solution consisting essentially of water having dissolved therein between 0.5 and 10% of nitric acid and between 3 and 15% of an alkali metal chloride so as to remove at least a portion of said impurities from said pyrite cinders; and separating the thus treated cinders from said solution.

5. A method of removing impurities selected from the group consisting of copper, zinc, lead, arsenic, gold and silver from pyrite cinders, comprising the steps of a leaching solution consisting essentially of contacting pyrite cinders with water having dissolved therein about 3% by weight of nitric acid and about 5% by weight of sodium chloride so as to remove at least a portion of said impurities from said pyrite cinders; and separating the thus treated cinders from said solution.

6. A method of removing impurities from pyrite cinders, comprising the steps of contacting pyrite cinders with a leaching solution consisting essentially of an aqueous solution of an alkali metal nitrate and hydrochloric acid so as to remove at least a portion of said impurities from said pyrite cinders; and separating the thus treated cinders from said solution.

7. A method of removing impurities from pyrite cinders, comprising the steps of contacting pyrite cinders with a leaching solution consisting essentially of water having dissolved therein effective amounts of sodium nitrate and hydrochloric acid so as to remove at least a portion of said impurities from said pyrite cinders; and separating the thus treated cinders from said solution.

8. A method of removing impurities selected from the group consisting of copper, zinc, lead, arsenic, gold and silver, comprising the steps of contacting said pyrite cinders for about two hours at about 70° C. with an about equal amount of a leaching solution consisting essentially of water having dissolved therein about 3% by weight of nitric acid and about 5% by weight of sodium chloride so as to remove at least a portion of said impurities from said pyrite cinders; and separating the thus treated cinders from said solution.

9. A method of removing impurities from pyrite cinders, comprising the steps of washing gases obtained in the catalytic oxidation of ammonia with water so as to obtain an aqueous solution containing $NO_2$ and $NO_3$ ions; dissolving NaCl in the thus formed solution; and leaching pyrite cinders with the thus obtained $NO_3$ and Cl ions containing aqueous solution.

References Cited

UNITED STATES PATENTS

| | | | |
|---|---|---|---|
| 514,041 | 2/1894 | Schwahn | 75—2 |
| 1,084,600 | 1/1914 | Best | 74—101 |
| 1,150,787 | 8/1915 | Rankin | 75—101 |
| 2,200,486 | 5/1940 | Burdick | 75—101 |
| 2,912,320 | 11/1959 | Chang | 75—101 |
| 2,916,357 | 12/1959 | Schaufelberger | 75—101 |
| 3,232,744 | 2/1966 | Munekata et al. | 75—101 |

DAVID L. RECK, *Primary Examiner.*

N. F. MARKVA, *Assistant Examiner.*